United States Patent [19]

Piller et al.

[11] Patent Number: 4,505,555
[45] Date of Patent: Mar. 19, 1985

[54] ILLUMINATING DEVICE FOR MICROSCOPES

[75] Inventors: Horst Piller; Reinhold Kipper, both of Aalen, Fed. Rep. of Germany

[73] Assignee: Carl-Zeiss-Stiftung, Heidenheim/Brenz, Fed. Rep. of Germany

[21] Appl. No.: 445,284

[22] Filed: Nov. 29, 1982

[30] Foreign Application Priority Data

Dec. 4, 1981 [DE] Fed. Rep. of Germany ....... 3147998

[51] Int. Cl.³ .............................................. G02B 21/06
[52] U.S. Cl. .................................. 350/527; 350/523; 350/526
[58] Field of Search ................................ 350/523–528

[56] References Cited

U.S. PATENT DOCUMENTS

| | | | |
|---|---|---|---|
| 3,669,524 | 6/1972 | Shio | 350/523 |
| 3,679,287 | 7/1972 | Takahashi et al. | 350/526 |
| 3,710,091 | 1/1973 | Holcomb | 350/527 |
| 3,785,714 | 1/1974 | Hock et al. | 350/524 |

FOREIGN PATENT DOCUMENTS

| | | | |
|---|---|---|---|
| 1235619 | 3/1967 | Fed. Rep. of Germany | 350/524 |
| 1913711 | 10/1969 | Fed. Rep. of Germany | 350/523 |
| 3037556 | 5/1982 | Fed. Rep. of Germany | 350/523 |
| 885275 | 12/1961 | United Kingdom | 350/523 |

OTHER PUBLICATIONS

Goldberg et al., "An Obvious Illuminator for Dispersion Staining", Microscope (G.B.), 1976, #4, pp. 291–294.
Weyrauch, A., "New Illuminating Device for Measuring Microscopes", Zeiss, Inf. (Germany), #75, 9-1970, pp. 26–28.
Erben et al., "A New Bright/Dark Field Incident Light Illuminator for the Universal Measuring Microscope of the Toolmakers' Microscope", Jana Review, vol. 15, #5, 1970, pp. 292–295.

Primary Examiner—William H. Punter
Attorney, Agent, or Firm—Stonebraker, Shepard & Stephens

[57] ABSTRACT

A fiber-optical Köhler illuminating device for microscopes in which a light-guide end surface serves as uniform increased-area source of secondary light. The light guide (10) terminates in a housing support (1) which can be removably attached to the microscope and for incident-light illumination can be placed directly on the tube-carrier arm (2) of the microscope and for transmitted-light illumination on the holder (5) of the condenser (7). The housing support contains, in series, an aperture diaphragm (13) arranged in the immediate vicinity of the light exit surface of the light guide (10), a collector (15), and an illuminating field diaphragm (16) arranged behind the collector.

7 Claims, 2 Drawing Figures

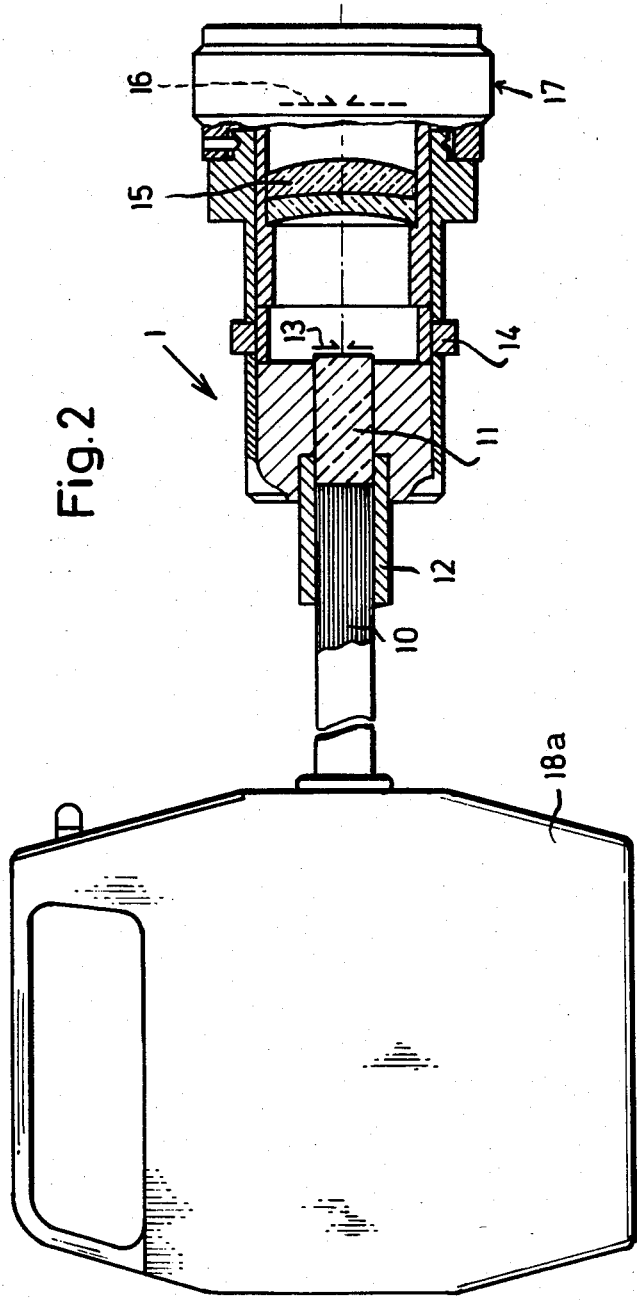

ILLUMINATING DEVICE FOR MICROSCOPES

BACKGROUND OF THE INVENTION

The present invention relates to a Köhler illuminating device for microscopes in which an end surface of a light-guide serves as a uniform, increased-area source of secondary light.

Microscope illuminating systems which use light guides have been known for a long time. The advantage of such illuminating systems resides, on the one hand, in their ease of handling and, on the other hand, in the thermal decoupling of the source of light, which is separated in space from the instrument and flexibly connected to it. Few fiber-optical microscope illuminating systems are, however, constructed in accordance with the Köhler principle which constitutes a basic prerequisite for microscopic work of high quality.

From West German published patent application No. OS 27 36 319 (Frosch et al.) of Feb. 22, 1979, a fiber-optical Köhler illuminating device for microscopes is known in which fiber optics is used to make the luminous density uniform in the object plane. For this purpose, radially displaceable diaphragms or diaphragms with radially extending absorption are arranged on the lamp side in front of the light guide in a plane conjugated to the object plane. This diaphragm arrangement is very sensitive to adjustment and this has a negative effect on the cost of manufacture and the reliability of the illuminating device. No special measures have been taken to make the luminous density in the aperture planes uniform and no information is given as to the three-dimensional structural development of the system.

In West German published patent application No. OS 27 20 650 (Bufe et al.) of Dec. 1, 1979, another illuminating device based on the Köhler principle is described. The distances between light, lamp collector and light-guide entrance surface are selected in such a manner that the distribution of the luminous density in the pupils of the illuminating beam takes place. The light-guide end surface is followed by the known Köhler optical system with collector, illuminating-field diaphragm and aperture diaphragm, which is arranged as customary in the rear focal plane of the following condenser.

Now, as a rule transmitted-light microscopes are constructed in the manner that the luminous-field diaphragm is located in the base of the stand on which the lamp housing is attached, while the aperture diaphragm is located directly in the rear focal plane of the condenser, which is arranged below the microscope stage. In the case of incident-light microscopes the illuminating device, on the other hand, is placed on the tube carrier of the microscope arm and an intermediate focusing of the source of light is effected, in the plane of which the aperture diaphragm is arranged in front of the illuminating-field diaphragm in the path of the light, since the rear focal plane of the objective which serves as condenser is generally not accessible. Incident-light illuminating devices are therefore relatively long and require support by the microscope if stability is important. Therefore, up to now different optical systems have been used for incident-light and transmitted-light illuminations, only individual components of which, such as for instance the lamp housing, are compatible with each other.

SUMMARY OF THE INVENTION

The object of the present invention is now to combine the components of an illuminating device of the aforementioned type within a compact structural unit which can be used both as incident-light and as transmitted-light illuminating device.

This object is achieved by providing a bundle of glass fibers against the end of which a glass body is placed for making the luminous density distribution uniform, and by enclosing the glass and the fiber ends in a housing support which can be fastened to the microscope and which contains, in series, an aperture diaphragm arranged in the immediate vicinity of the light exit surface of the glass body, a collector, as well as an illuminating-field diaphragm.

The arrangement of the optical system in accordance with the invention, in which the aperture diaphragm is arranged directly in front of the end surface of the light guide, has several advantages:

When the incident-light illuminating device is used, a shortening is obtained as compared with traditional Köhler illuminating systems since the present invention eliminates the conventional rigid lamp housing which is attached by flanges and has a multi-lens, strongly magnifying collector, as well as the optical system for the formation of the intermediate image of the source of light. The illuminating device can thus be placed directly on the tube-carrier arm of the microscope without additional support by the stand.

In the case of transmitted light, the condenser housing can be developed much more simply since in that case it is not necessary any longer to provide an aperture diaphragm, the actuating of which was always inconvenient for the user due to the arrangement in space of the condenser directly below the stage of the microscope. Furthermore, the possibility is provided of using ordinary objectives, whose housing does not contain an aperture iris diaphragm, as condensers with adjustable aperture. This case is of interest in particular for transmitted-light photometry.

The making uniform of the luminous density of the end surface of the light guide is obtained in simple manner by a glass body in which the individual intensities of the bundles of light emerging from the fibers are statistically superimposed. By this solution, an extremely simple construction of the illuminating device is obtained.

With respect to the possibility of converting the microscope from transmitted-light to incident-light illumination when the device in accordance with the invention is used, only minimum requirements need be made on the stand of the microscope which, aside from the condenser, does not have to contain any other illuminating components. The conversion is effected by removing the illuminating device from the condenser mount and placing it on the microscope arm.

The aperture diaphragm arranged in front of the light-guide surface may advantageously be developed in known manner as an aperture iris diaphragm of variable diameter. It is furthermore possible to arrange, also replaceably, the annular diaphragms which are necessary in order to obtain phase contrast within this plane. In such case, since the diameter of this light-guide end surface which serves as a source of secondary light is much greater than the filament of a traditional microscopy lamp, a collector of relatively long focal length can be used, the imaging capacity of which assures a sufficiently precise imaging of the annular diaphragms on the phase rings in the focal plane of the objective.

If the aperture diaphragm is arranged in radially displaceable fashion in front of the light guide, so-called "oblique illumination" can be obtained in which the object observed shows a three-dimensional effect.

It is furthermore advantageous to fasten the light-guide end, possibly together with the glass body, in replaceable manner within the housing of the illuminating device. In such case, any fiber-optical sources of cold light, which are available on the market for the most different purposes and in different qualities, can be used as source of light.

Thus a fiber-optical system can be used which acts as cross-section converter on the light-entrance side of which the fibers are, for instance, packed rectangularly and arranged at the outlet slit of a monochromator while the light-exit surface of the fiber bundle has the circular cross section customary for microscopy.

BRIEF DESCRIPTION OF THE DRAWINGS

The invention will be explained in further detail below with reference to the accompanying drawings, in which:

FIG. 2 is a section through an embodiment of the illuminating device of the invention.

DESCRIPTION OF THE PREFERRED EMBODIMENT

Figure 1:
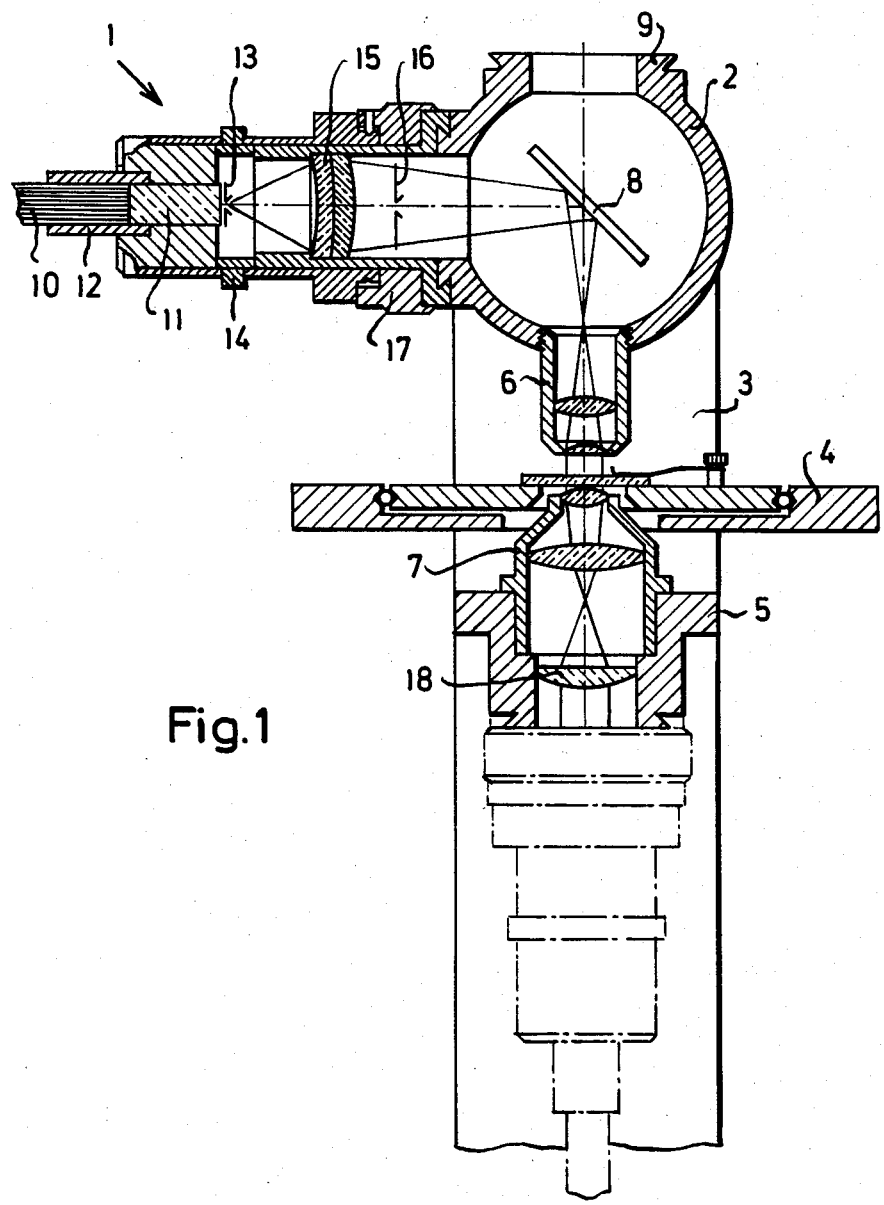
FIG. 1 is a section through the essential components of a microscope which can operate either in transmitted light or in incident light.

The microscope shown in FIG. 1 consists of a stand 3 which bears the microscope arm 2, with the objective 6, and also bears the microscope stage 4 as well as the holder 5 for the condenser 7.

The microscope arm 2 has an annular dovetail 9 to which a binocular tube (not shown) can, for instance, be fastened, as well as splitter mirror 8 which deflects the light supplied by the illuminating device 1 through the objective onto the object located below it. The illuminating device 1 is also fastened by an annular dovetail to the microscope arm 2 and can be removed in order to be placed as a transmitted-light illuminating device on the holder 5 of the condenser 7, as indicated in dot-dash lines. An auxiliary lens 18 is arranged below the condenser 7 and serves to shorten the backfocus of the illuminating device 1.

As shown in FIG. 2, the illuminating device 1 comprises a housing which is connected via a glass-fiber cable 10 to a source of cold light 18a of known construction. The end of the glass-fiber cable 10 is surrounded by a sleeve 12 into which a glass body 11 is pushed. Glass-fiber cable, sleeve and glass body are fastened replaceably within the housing of the illuminating device 1.

Directly in front of the end surface of the cylindrical glass body 11 there is arranged an aperture iris diagragm 13 which can be actuated by means of a rotatable ring 14. The movement mechanism between ring and diaphragm is conventional and has not been shown, for the sake of simplicity.

The aperture iris diaphragm 13 is followed by a collector 15 which images the diaphragm 13 in the rear focal plane of the objective 6, when the illuminating device is attached in the full-line position shown in FIG. 1, and images it by means of the lens 18 in the focal plane of the condenser 7, when the illuminating device is attached in the dot-dash line position shown. The iris diaphragm 16 which is actuatable by a second ring 17 serves as illuminating field diaphragm and is focused by the objective 6 or the condenser 7 into the object plane.

What is claimed is:

1. A Köhler illuminating device for microscopes, said device comprising a light guide serving as a uniform increased-area source of secondary light, said light guide including a bundle of glass fibers having an exit end, a glass body engaged against said end for receiving light transmitted through said bundle and for producing a substantially uniform luminous density distribution at a light exit surface of said glass body, a housing containing said glass body and said exit end of said bundle, an aperture diaphragm (13) in said housing in the immediate vicinity of said light exit surface of said glass body to control the aperture of a light beam issuing therefrom, an illuminating field diaphragm (16) also in said housing in the path of light passing said aperture diaphragm, a collector (15) located in the path of light between said aperture diaphragm and said illuminating field diaphragm, and means for attaching said housing selectively as desired, either on a microscope arm of a reflected-light microscope, in position to illuminate a specimen by reflected light, or to a holder of a condenser of a transmitted-light microscope, in position to illuminate a specimen by transmitted light.

2. The invention defined in claim 1, wherein the diameter of the aperture diaphragm (13) is variable.

3. The invention defined in claim 1, wherein the aperture diaphragm (13) has the form of an annular diaphragm.

4. The invention defined in claim 1, wherein the aperture diaphragm (13) is radially displaceable.

5. The invention defined in claim 1, wherein the light-guide end (10) is replaceably fastened in said housing (1).

6. The invention defined in claim 1, wherein said glass body (11) is replaceably fastened in said housing (1).

7. The invention defined in claim 1, wherein the light exit end of said bundle (10) is round, said glass body (11) is of cylindrical shape, and the light guide has a light entrance surface with a cross-sectional shape other than circular.

* * * * *